United States Patent Office 3,586,693
Patented June 22, 1971

---

3,586,693
IMIDAZO[1,2-a]INDOLIN-9-OLS
Stanley C. Bell, Penn Valley, Pa., assignor to American Home Products Corporation, New York, N.Y.
No Drawing. Continuation-in-part of application Ser. No. 713,327, Mar. 15, 1968, which is a continuation-in-part of application Ser. No. 614,826, Feb. 9, 1967. This application July 7, 1969, Ser. No. 839,636
Int. Cl. C07d 57/02
U.S. Cl. 260—309
10 Claims

ABSTRACT OF THE DISCLOSURE

This invention relates to new imidazo[1,2-a]indolin-9-ols which have demonstrated pharmacological activity as central nervous system depressants.

---

This is a continuation-in-part application of U.S. patent application, Ser. No. 713,327, filed on Mar. 15, 1968 by Stanley C. Bell, entitled "Synthesis of Imidazo[1,2-a]-Indolin-9-Ols," now abandoned, which in turn is a continuation-in-part application of U.S. patent application, Ser. No. 614,826 filed on Feb. 9, 1967 by Stanley C. Bell, entitled "Synthesis of Imidazo[1,2-a]Indolin-9-Ols," now abandoned.

This invention relates to new and novel substituted imidazoindolinols. More particularly, this invention is concerned with imidazo[1,2-a]indolin-9-ols which in standard and accepted pharmacological tests have demonstrated central nervous system depressant activity.

The new and novel compounds within the scope of the present invention are illustrated by the following formula:

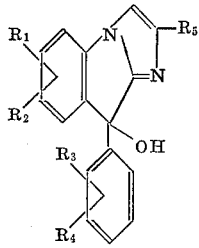

wherein $R_1$, $R_2$, $R_3$ and $R_4$ are selected from the group consisting of hydrogen, halogen, lower alkyl and lower alkoxy; and $R_5$ is selected from the group consisting of lower alkyl, phenyl, nitrophenyl, halophenyl, lower alkylphenyl and lower alkoxyphenyl. As employed herein the terms "lower alkyl," "lower alkoxy" and the like are meant to encompass both branched and straight chain moieties having from one to about eight carbon atoms. Typical examples thereof are: 7-chloro-2-(4-nitrophenyl)-9-phenylimidazo[1,2-a]indolin-9-ol; 6-bromo-2,9-diphenylimidazo[1,2-a]indolin-9-ol; 2-methyl-9-phenylimidazo-[1,2-a]indolin-9-ol; and 7-chloro-6-methyl-2,9-diphenylimidazo[1,2-a]indolin-9-ol.

The new and novel imidazoindolinols of the present invention may be prepared by the process which is exemplified by the following reaction scheme:

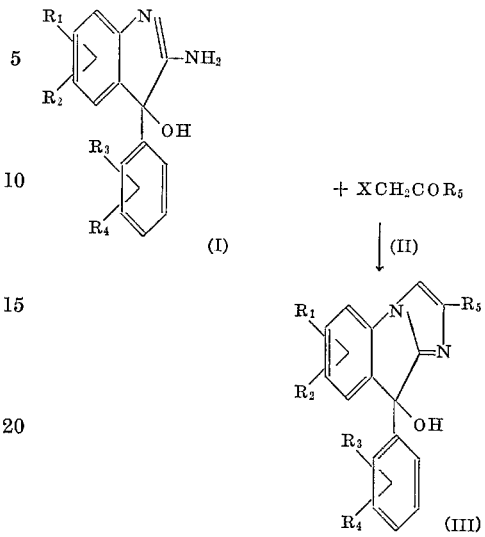

wherein $R_1$, $R_2$, $R_3$, $R_4$ and $R_5$ are defined as above, and X is bromo or chloro. The reaction is effected by heating a mixture of substantially equimolar amounts of the reactants in a reaction-inert organic solvent at a temperature range from about 60° C. to about 120° C. for a period of about one to three hours. Preferably this reaction is conducted in dimethylformamide at about steam-bath temperatures for about two hours. By the term "reaction-inert organic solvent" as employed in the above reaction is meant any organic solvent which will dissolve the reactants and not interfere with their interaction e.g. an alkanol, dimethylformamide and dimethylacetamide.

After the reaction is complete, the reaction mixture is diluted with water. Thereafter, the imidazoindolinol (III) is obtained by conventional methods, such as, suspension of the solid product in an alkanol e.g. ethanol, filtration and recrystallization from a suitable solvent e.g. ethanol.

The aminoindolols (I) used as starting materials to prepare the compounds of the present invention are synthesized by the procedure described in co-pending U.S. patent application, Ser. No. 694,066, filed on Dec. 28, 1967, entitled "Process for the Preparation of 3-Aryl-2-Imino-3-Indolinols and 2-Amino-3-Aryl-3H-Indol-3-Ols" by Stanley C. Bell and Carl Gochman. Therein the aminoindolols (I) are prepared by reacting a 2-benzoyl acylanilide with an ionic cyanide e.g. potassium cyanide in a water-miscible organic solvent such as an alkanol, in the presence of a portion donor e.g. water, at a temperature range of about 0° to about 50° C. for a period of about one-quarter of an hour to about seventy-two hours. Thereafter, the reaction mixture is diluted with water to afford an appropriate aminoindolol (I) which may be recrystallized from a suitable solvent e.g. acetonitrile. The preparation of these starting materals (I) is hereinafter illustrated in Example II. Further, the above-described 2-benzoyl acylanilides are prepared by the procedure set forth in co-pending U.S. patent application Ser. No. 689,009, filed Dec. 8, 1967, entitled "Novel Synthesis of Quinazolines" by Stanley C. Bell and Carl Gochman. Therein the 2-benzoyl acylanilides are prepared by reacting a 2-aminobenzophenone with a haloalkanoylhalide in a reaction-inert solvent e.g. chloroform for about two hours. Thereafter, the reaction mixture is evaporated to dryness to afford an appropriate 2-benzoyl acylanilide which may be crystallized from an appropriate solvent e.g. ethanol. The preparation of these 2-benzoyl acylanilides is hereinafter specifically demonstrated in Example I.

The phenacyl halides (II) and haloalkanones (II) used as the other starting materials in the aforementioned process are known compounds which may be readily obtained from comercial sources or are easily prepared by standard procedures well known to those skilled in the art of organic chemistry. For example, these phenacyl halides (II) and haloalkanones (II) may be prepared by reacting an appropriate acetophenone or alkanone with one molar equivalent of a halogen in a reaction-inert solvent e.g. ether, in the presence of aluminum chloride. When the reaction is complete, the product is easily recovered by routine separation procedures.

The new and novel imidazoindolinols of the present invention have been found to possess interesting pharmacological activity. In particular, these compounds in standard pharmacological procedures demonstrate nervous system activity and are, therefore, useful in producing a calming effect in animals.

In the pharmacological evaluation of the central nervous system depressant compounds of this invention the in vivo effects of the compound of this invention are tested as follows:

The compound is administered intraperitoneally to three mice (14 to 24 grams) at each of the following doses: 400, 127, 40 and 12.7 mg./kg. The animals are watched for a minimum of two hours during which time signs of general stimulation (i.e., increased spontaneous motor activity, hyperactivity on tactile stimulation, twitching), general depression (i.e., decreased spontaneous motor activity, decreased respiration) and autonomic activity (i.e., miosis, mydriasis, diarrhea) are noted. The animals are tested for changes in reflexes (i.e., flexor, extensor) and are rated by use of a pole climb and inclined screen for the presence of sedation-ataxia. The "Eddy Hot-Plate Method" [Nathan B. Eddy and Dorothy Leimbach, J. Pharmacol. Exper. Therap. 107, 385 (1953)] is used to test for analgesia. The experiment is terminated by subjecting each animal to a maximal electroshock to test for anticonvulsant activity.

When the imidazoindolinols of the present invention are intraperitoneally administered in the above-described procedure at a dosage of 400 mg./kg. as a one percent suspension emulsified with polyethylene oxide sorbitan monooleate, they produce decreased motor activity and decreased respiration.

When the compound of this invention are employed as central nervous system depressant agents they may be administered to warm-blooded animals e.g. mice, rats, rabbits, guinea pigs, cats, dogs monkeys and the like alone or in combination with pharamacologically acceptable carriers, the proportion of which is determined by the solubility and chemical nature of the compound, chosen route of administration and standard biological practice. For example, they may be administered orally in the solid form containing such excipients as starch, milk sugar and so forth. They may also be administered orally in the form of solutions or they may be injected parenterally. For parenteral administration they may be used in the form of a sterile solution containing other solutes, for example, enough saline or glucose to make the solution isotonic.

The dosage of the present pharmacologically active agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The folowing examples are given by way of illustration:

EXAMPLE I

To a solution of 231 g. of 2-amino-5-chlorobenzophenone in 1.1 liters of chloroform there is slowly added 144 g. of β-chloropropionylchloride. The mixture is stirred at room temperature for two hours. After the solvent is removed in vacuo, the residue is dissolved in 400 ml. of ethanol. Upon cooling, the crystallized solids which separate are collected (242 g.). By concentrating the mother liquor 26 g. is recovered. The crude material is recrystallized from cyclohexane to afford 2'-benzoyl-3,4'-dichloropropionanilide, M.P. 75–6° C.

*Analysis.*—Calcd for $C_{16}H_{13}Cl_2NO_2$ (percent): C, 59.60; H, 4.07; Cl, 22.02; N, 4.35. Found (percent): C, 59.41; H, 3.89; Cl, 21.90; N, 4.08.

EXAMPLE II

To a suspension of 10.0 g. of 2'-benzoyl-2,2,4'-trichloroacetanilide in 150 milliliters (ml.) of ethanol is added a solution of 6.0 g. of potassium cyanide in 50 ml. of water. After stirring about sixteen hours the reaction mixture is filtered from the insoluble material and diluted with water to precipitate 7.0 g. of product. Recrystallization from acetonitrile gives the pure compound, 2-amino-5-chloro-3-phenyl-3H-indol-3-ol, M.P. 215–217° C.

*Analysis.*—Calcd for $C_{14}H_{11}ClN_2O$ (percent): C, 64.99; H, 4.29; N, 10.83; Cl, 13.20. Found (percent): C, 65.02; H, 3.98; N, 10.70; Cl, 13.70.

EXAMPLE III

A mixture of 5.7 g. of 2-amino-5-chloro-3-phenyl-3H-indol-3-ol, 3.5 g. of p-nitrophenacyl bromide and 50 ml. of dimethylformamide is heated to steam bath temperatures for two hours. Thereafter, the reaction mixture is diluted with water, the sticky solid suspended in ethanol and then separated by filtration. In this manner, there is obtained 1.8 g. of product which is recrystallized from ethanol to afford 7-chloro-2-(4-nitrophenyl)-9-phenylimidazo[1,2-a]indolin-9-ol, M.P. 248–249° C.

*Analysis.*—Calcd for $C_{22}H_{14}ClN_3O_3$ (percent): C, 65.44; H, 3.49; N, 10.41; Cl, 8.78. Found (percent): C, 65.09; H, 3.41; N, 10.40; Cl, 8.6.

In a similar manner, reacting 2-amino-6-bromo-3-phenyl-3H-indol-3-ol with phenacyl chloride, there is obtained 6-bromo-2,9-diphenylimidazo[1,2-a]indolin-9-ol.

EXAMPLE IV

A mixture of 11.0 g. of 2-amino-3-(4-chlorophenyl)-7-methyl-3H-indol-3-ol, 7.0 g. of p-chlorophenacyl bromide and 100 ml. of dioxane is heated to 80° C. for two hours. Thereafter, the reaction mixture is diluted with water, the solid suspended in methanol and then separated by filtration. In this manner, there is obtained 2,9-di(4-chlorophenyl)-5-methylimidazo[1,2-a]indolin-9-ol.

Similarly, 6,7 - dichloro-2-(4-ethylphenyl)-9-phenylimidazo[1,2-a]indolin-9-ol; 7-fluoro-2-(4-methoxyphenyl)-9-phenylimidazo[1,2-a]indolin-9-ol and 6,7-dibromo-2,9-diphenylimidazo[1,2-a]indolin-9-ol are synthesized.

EXAMPLE V

A mixture of 2.7 g. of 2-amino-3-phenyl-3H-indol-3-ol, 1.7 g. of 1-chloro-2-propanone and 25 ml. of dimethylformamide is heated on a steambath for one hour. Thereafter, the reaction mixture is diluted with water, the solid suspended in ethanol and then separated by filtration. In this manner, there is obtained 2-methyl-9-phenylimidazo[1,2-a]indolin-9-ol.

In a similar manner, reacting an aminoindolol with an appropriate haloalkanone, the following imidazoindolinols are prepared:

9-(3,4-dichlorophenyl)-3-ethylimidazo[1,2-a]indolin-9-ol;
7-methoxy-9-phenyl-2-propylimidazo[1,2-a]indolin-9-ol;
2-pentyl-9-phenylimidazo[1,2-a]indolin-9-ol; and
9-(4-bromophenyl)-6-ethyl-2-methylimidazo[1,2-a]indolin-9-ol.

EXAMPLE VI

A mixture of 2.5 g. of 2-amino-5-ethyl-3-(4-tolyl)-3H-indol-3-ol, 3.5 g. of p-nitrophenacyl bromide and 50 ml. of dimethylformamide is heated to steambath temperatures for three hours. Thereafter, the reaction mixture is diluted with water, the solid suspended in ethanol and then separated by filtration. In this manner, there is obtained 7 - ethyl-2,4-nitrophenyl-9-(4-tolyl)imidazo[1,2-a] indolin-9-ol.

EXAMPLE VII

Repeating the procedure of Examples III to VI to react an appropriate aminoindolol with a phenacyl halide or haloalkanone, the following imidazoindolinols are prepared:

6,7-dibromo-9-(3-fluorophenyl)-2-(4-tolyl)-imidazo-[1,2-a]indolin-9-ol;
9-(4-methoxyphenyl)-2,7-dipropylimidazo[1,2-a] indolin-9-ol;
7-ethoxy-9-(3,4-dimethylphenyl)-2-phenylimidazo-[1,2-a]indolin-9-ol;
6-ethoxy-2-(4-ethoxyphenyl)-9-phenylimidazo[1,2-a] indolin-9-ol;
7-chloro-6-methyl-2,3-diphenylimidazo[1,2-a]indolin-9-ol;
6,7-dimethoxy-9-(4-methoxyphenyl)-2-phenylimidazo[1,2-a]indolin-9-ol; and
9-(4-ethylphenyl)-2-phenylimidazo[1,2-a]indolin-9-ol.

What is claimed is:
1. A compound selected from the group consisting of those having the formula:

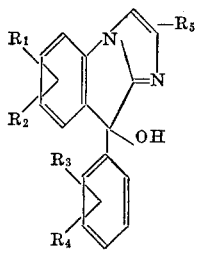

wherein $R_1$, $R_2$, $R_3$ and $R_4$ are selected from the group consisting of hydrogen, halogen, lower alkyl and lower alkoxy; and $R_5$ is selected from the group consisting of lower alkyl, phenyl, nitrophenyl, halophenyl, lower alkylphenyl, and lower alkoxyphenyl.

2. A compound as described in claim 1 which is: 7-chloro - 2 - (4 - nitrophenyl)-9-phenylimidazo[1,2-a] indonil-9-ol.

3. A compound as described in claim 1 which is: 6-bromo-2,9-diphenylimidazo[1,2-a]indolin-9-ol.

4. A compound as described in claim 1 which is: 2,9-di(4-chlorophenyl)-5 - methylimidazo[1,2-a]indolin-9-ol.

5. A compound as described in claim 1 which is: 2-methyl-9-phenylimidazo[1,2-a]indolin-9-ol.

6. A compound as described in claim 1 which is: 9-(3,4-dichlorophenyl)-2-ethylimidazo[1,2-a]indolin-9-ol.

7. A compound as described in claim 1 which is: 2-pentyl-9-phenylimidazo[1,2-a]indolin-9-ol.

8. A compound as described in claim 1 which is: 7-ethyl - 2 - (4 - nitrophenyl) - 9-(4-tolyl)imidazo[1,2-a] indolin-9-ol.

9. A compound as described in claim 1 which is: 9-(4 - methoxyphenyl) - 2,7-dipropylimidazo[1,2-a]indolin-9-ol.

10. A compound as described in claim 1 which is: 7-chloro - 6 - methyl - 2,9 - diphenylimidazo[1,2-a]indolin-9-ol.

References Cited

Betrabet et al.: Chem. Abstr., vol. 25, pages 701–2 (1931).
Geigy Chem. Abstr., vol. 64, columns 6664–5 (1966).
Glushkov et al.: Chem. Abstr., vol. 63, columns 13258–9 (1965).
Khan et al.: Can. J. Chem., vol. 46, pages 2629–31 (1968).
Merck Chem. Abstr., vol. 63, columns 18097–8 (1965).
Metlesics et al.: J. Org. Chem., vol. 33, pages 2874–7 (1968).
Shirley et al.: J. Amer. Chem. Soc., vol. 79, pages 4922–7 (1957).

NATALIE TROUSOF, Primary Examiner

U.S. Cl. X.R.

260—326.15, 562B; 424—273